United States Patent
Debevec

(10) Patent No.: US 7,436,403 B2
(45) Date of Patent: Oct. 14, 2008

(54) PERFORMANCE RELIGHTING AND REFLECTANCE TRANSFORMATION WITH TIME-MULTIPLEXED ILLUMINATION

(75) Inventor: Paul E. Debevec, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 159 days.

(21) Appl. No.: 11/150,012

(22) Filed: Jun. 10, 2005

(65) Prior Publication Data

US 2005/0276441 A1 Dec. 15, 2005

Related U.S. Application Data

(60) Provisional application No. 60/579,047, filed on Jun. 12, 2004.

(51) Int. Cl.
*G06T 15/50* (2006.01)
*H04N 5/222* (2006.01)
*G01N 21/55* (2006.01)
*G03B 15/02* (2006.01)
*G06K 9/00* (2006.01)
*G09G 5/00* (2006.01)

(52) U.S. Cl. .................. 345/426; 345/634; 345/960; 348/371; 356/445; 362/11; 382/100

(58) Field of Classification Search .............. 345/960
See application file for complete search history.

(56) References Cited

U.S. PATENT DOCUMENTS 5,704,702 A 1/1998 Goto
5,802,220 A * 9/1998 Black et al. .............. 382/276

(Continued)

FOREIGN PATENT DOCUMENTS

| WO | WO 02 101454 A1 | 12/2002 |
| WO | WO 02 101455 A1 | 12/2002 |
| WO | WO 02 101645 A2 | 12/2002 |
| WO | WO 02 101646 A2 | 12/2002 |

OTHER PUBLICATIONS

David Akers, Frank Losasso, Jeff Klingner, Maneesh Agrawala, John Rick, Pat Hanrahan, "Conveying Shape and Features with Image-Based Relighting," Oct. 22, 2003, Proceedings of the 14th Visualization 2003 (VIS'03), 349-354.*

(Continued)

*Primary Examiner*—Ulka Chauhan
*Assistant Examiner*—Jason M Repko
(74) *Attorney, Agent, or Firm*—McDermott Will & Emery LLP

(57) ABSTRACT

A lighting apparatus may be configured to illuminate a subject while the subject is undergoing a motion during a time period. An imaging system may be configured to generate image data representative of a sequence of frames of the moving subject. A controller may be configured to drive the lighting apparatus and the imaging system so that the lighting apparatus sequentially illuminates the moving subject with a time-multiplexed series of lighting conditions, and so that each one of the frames shows the subject illuminated with a respective one of the lighting conditions. The controller may be further configured to process the image data to generate re-illumination data representative of novel illumination conditions under which the subject can be re-illuminated, subsequent to the time period.

16 Claims, 2 Drawing Sheets

U.S. PATENT DOCUMENTS

| | | | |
|---|---|---|---|
| 5,894,309 | A | 4/1999 | Freeman et al. |
| 6,018,350 | A | 1/2000 | Lee et al. |
| 6,078,332 | A | 6/2000 | Ohazama |
| 6,313,842 | B1 | 11/2001 | Tampieri |
| 6,337,692 | B1 | 1/2002 | Rai et al. |
| 6,396,505 | B1 | 5/2002 | Lui et al. |
| 6,685,326 | B2 | 2/2004 | Debevec et al. |
| 6,888,552 | B2 | 5/2005 | Debevec et al. |
| 6,919,962 | B2 | 7/2005 | Debevec et al. |
| 7,102,638 | B2* | 9/2006 | Raskar et al. ............... 345/428 |
| 7,103,227 | B2* | 9/2006 | Raskar et al. ............... 382/266 |
| 2002/0186314 | A1 | 12/2002 | Debevec |
| 2005/0018223 | A1 | 1/2005 | Debevec |
| 2005/0254720 | A1* | 11/2005 | Tan et al. .................... 382/254 |

OTHER PUBLICATIONS

Ramesh Raskar, Kar-Han Tan, Rogerio Feris, Jingyi Yu, Matthew Turk, "Non-Photorealistic Camera: Depth Edge Detection And Stylized Rendering Using Multi-Flash Imaging," Aug. 2004, ACM Transactions on Graphics (TOG), vol. 23, No. 3, p. 679-688.*

Ramesh Raskar, Greg Welch, Matt Cutts, Adam Lake, Lev Stesin, and Henry Fuschs, "The Office Of The Future: A Unified Approach To Image-Based Modeling And Spatially Immersive Displays," Jul. 19, 1998, Proceedings of the 25th Annual Conference on Computer Graphics and Interactive Techniques, p. 179-188.*

Paul Debevec, Tim Hawkins, Chris Tchou, Haarm-Pieter Duiker, Westley Sarokin, Mark Sagar, "Acquiring the Reflectance Field of a Human Face," Jul. 23, 2000, Proceedings of the 27th Annual Conference on Computer Graphics and Interactive Techniques, pp. 145-156.*

Gabriel J. Brostow, Irfan Essa, "Image-Based Motion Blur for Stop Motion Animation," Aug. 2001, Proceedings of the 28th Annual Conference on Computer Graphics and Interactive Techniques, p. 561-566.*

Paul Debevec, Andreas Wenger, Chris Tchou, Andrew Gardner, Jamie Waese, Tim Hawkins, "A Lighting Reproduction Approach to Live-Action Compositing," Jul. 2002, ACM Transactions on Graphics (TOG), vol. 21, No. 3, p. 547-556.*

Stephen R. Marchner, Brian K. Guenter, Sashi Raghupathy, "Modeling and Rendering for Realistic Facial Animation," Jun. 26, 2000, Proceedings of the Eurographics Workshop on Rendering Techniques 2000, p. 231-242.*

Vidor, Z. An Infrared Self-Matting Process. Journal of the Society of Motion Picture and Television Engineers, Jun. 1960, pp. 425-427.

Fielding, R. The Technique of Special Effects Cinematography, "Multi-film Systems" 4th edition, Hastings House, New York, 1985, pp. 203-215.

Debevec, P. Rendering synthetic objects into real scenes: Bridging traditional and image-based graphics with global illumination and high dymamic range photography. 1998. Proceedings of SIGGRAPH 98. pp. 189-198.

Debevec, P. et al. Acquiring the Reflectance Field of a Human Face. 2000. SIGGRAPH 2000 Proceedings.

Debevec, P. et al. Facial Reflectance Field Demo, accompanies "Acquiring the Reflectance Field of a Human Face." 2000. Located online at 222.debevec.org/FaceDemo/.

Debevec, P. et al. A Lighting reproduction approach to live-action compositing. 2002. ACM Transactions on Graphics. vol. 21, No. 3, pp. 547-556.

Debevec, P. et al. Postproduction Re-Illumination of Live Action Using Time-Mutiplexed Lighting, University of Southern California, Institute for Creative Technologies, Technical Report No.: ICT TR 05.2004. 2004.

Haeberli, P. Synthetic Lighting for Photography, Jan. 1992. Published at http://www.sgi.com/grafica/synth/index.html.

Hawkins, Tim et al. A Photometric approach to digitizing cultural artifacts, In 2nd International Symposium on Virtual Reality, Archaeology and Cultural Heritage, Glyfada, Greece, Nov. 2001.

Hawkins, Tim et al. Animatable Facial Reflectance Fields. In proceedings of Eurographics Symposium on Rendering. 2000. H.W. Jensen, A. Keller, editors.

Jones, Andrew et al. Performance Geometry Capture for Spatially Varying Relighting. Summary of Results available at http://gl.ict.usc.edu/research/ SpatialRelighting/, Nov. 2006.

Wenger, Andreas et al. Optimizing Color Matching in a Lighting Reproduction System for Complex Subject and Illuminant Spectra. Eurographics Symposium on Rendering, 2003.

Wenger, Andreas et al. Performance Relighting and Reflectance Transformation with Multiplexed Illumination. SIGGRAPH 2005 Papers Proceedings. 2005.

* cited by examiner

PERFORMANCE RELIGHTING AND REFLECTANCE TRANSFORMATION WITH TIME-MULTIPLEXED ILLUMINATION

CROSS-REFERENCE TO RELATED APPLICATIONS

This application claims the benefit of priority under 35 U.S.C. § 119(e) from U.S. Provisional Application Ser. No. 60/579,047 entitled "Method and Apparatus for Postproduction Re-illumination of Live Performances" and filed on Jun. 12, 2004, by inventor Paul E. Debevec. The provisional application's Ser. No. 60/579,047 is incorporated herein by reference in its entirety.

STATEMENT REGARDING FEDERALLY SPONSORED RESEARCH

This work was funded in part by Army Research Office contract # DAAD 19-99-D-0046.

BACKGROUND

In motion pictures, lighting may be used not only to help actors and sets look their best, but as an integral part of storytelling to set mood, direct attention, and underscore performance. The importance of lighting may be reflected in the high proportion of time and expense spent on lighting: by some estimates, one half or more of the valuable time spent on a set may be involved in setting up the lighting.

Several aspects of film production may be performed after principal photography, such as editing, sound effects, scoring, color correction, and visual effects. In each case, the fact that the process can be performed as part of postproduction may allow results to be progressively improved and revised by the filmmakers after principal photography. Lighting, in contrast, may in large part have to be finalized at the time each scene is filmed. This requirement may add complication and cost to principal photography, and may provide limited options for modification and improvement during postproduction. A situation where this is a particularly difficult constraint may occur when shooting actors in front of a green screen or a related matting background. In this case, the lighting on the actor may often have to be chosen before the virtual backgrounds are finalized, posing difficulties for achieving consistent illumination between the actors and the background.

SUMMARY

An apparatus may include a lighting apparatus configured to illuminate a subject with a time-multiplexed series of lighting conditions while the subject is undergoing a motion during a time period. The apparatus may further include an imaging system configured to generate image data representative of a sequence of frames of the moving subject, each one of the frames showing the subject illuminated with a respective one of the lighting conditions. The apparatus may further include a processing system configured to process the image data to generate re-illumination data representative of novel illumination conditions under which the subject can be re-illuminated, subsequent to the time period.

An apparatus may include means for sequentially illuminating a subject with a time-multiplexed series of rapidly changing lighting conditions while the subject is undergoing a motion during a time period. The apparatus may further include means for generating image data representative of a sequence of frames of the subject undergoing the motion, each one of the frames showing the subject illuminated with a respective one of the lighting conditions. The apparatus may further include processing means for processing the image data to generate re-illumination data representative of novel illumination conditions under which the subject can be re-illuminated, subsequent to the time period.

An apparatus may include a lighting apparatus configured to illuminate a subject while the subject is undergoing a motion during a time period. The apparatus may further include a matting background positionable behind the subject and configured to be illuminated so as to yield, when imaged, an image of the subject against the illuminated background. The apparatus may further include a video camera configured to generate image data representative of a sequence of frames of the subject undergoing the motion, and further configured to generate matte image data representative of time-multiplexed matte frames. The apparatus may further include a processing system configured to process the matte image data so as to composite the motion of the subject into a new background.

A method may include sequentially illuminating a subject with a time-multiplexed series of lighting conditions while the subject is undergoing a motion, and generating image data representative of a sequence of frames of the moving subject, wherein each one of the frames shows the subject illuminated with a respective one of the lighting conditions. The method may further include processing the image data to generate re-illumination data representative of novel illumination conditions under which the subject can be re-illuminated, subsequent to the time period.

An apparatus may include a lighting apparatus configured to sequentially illuminate a subject with a time-multiplexed series of lighting conditions while the subject is undergoing a motion during a time period. The apparatus may further include a plurality of imaging systems, each of the imaging systems configured to substantially simultaneously generate from a corresponding plurality of viewpoints image data representative of a sequence of frames of the moving subject, each of the frames showing the subject illuminated with a respective one of the time-multiplexed lighting conditions. The apparatus may further include a processing system configured to process the image data to generate re-illumination data representative of novel illumination conditions under which the subject can be re-illuminated, from one or more of the plurality of viewpoints, subsequent to the time period.

BRIEF DESCRIPTION OF THE DRAWINGS

FIG. 3 schematically illustrates an exemplary motion compensation process through which a motion of a subject is compensated for.

DETAILED DESCRIPTION

An apparatus and method are described that allow an actor's live-action performance to be captured in such a way that the lighting and reflectance of the actor can be designed and modified in postproduction. A subject (e.g. an actor) may be illuminated with a sequence of time-multiplexed basis lighting conditions, while undergoing motion. These conditions may be recorded with a high-speed video camera so that many conditions are recorded in the span of a desired output frame interval. Several lighting bases may be designed to represent the sphere of incident illumination using a set of discrete LED light sources. The motion of the subject may be estimated and compensated for, using optical flow and image warping based on a set of tracking frames inserted into the lighting basis. To composite the illuminated performance into a new background, a time-multiplexed matte may be included within the basis. The acquired image data may enable time-varying surface normals, albedo, and ambient occlusion to be estimated, which may allow the subject's reflectance to be transformed to produce a range of subtle and stylistic effects.

Figure 1:
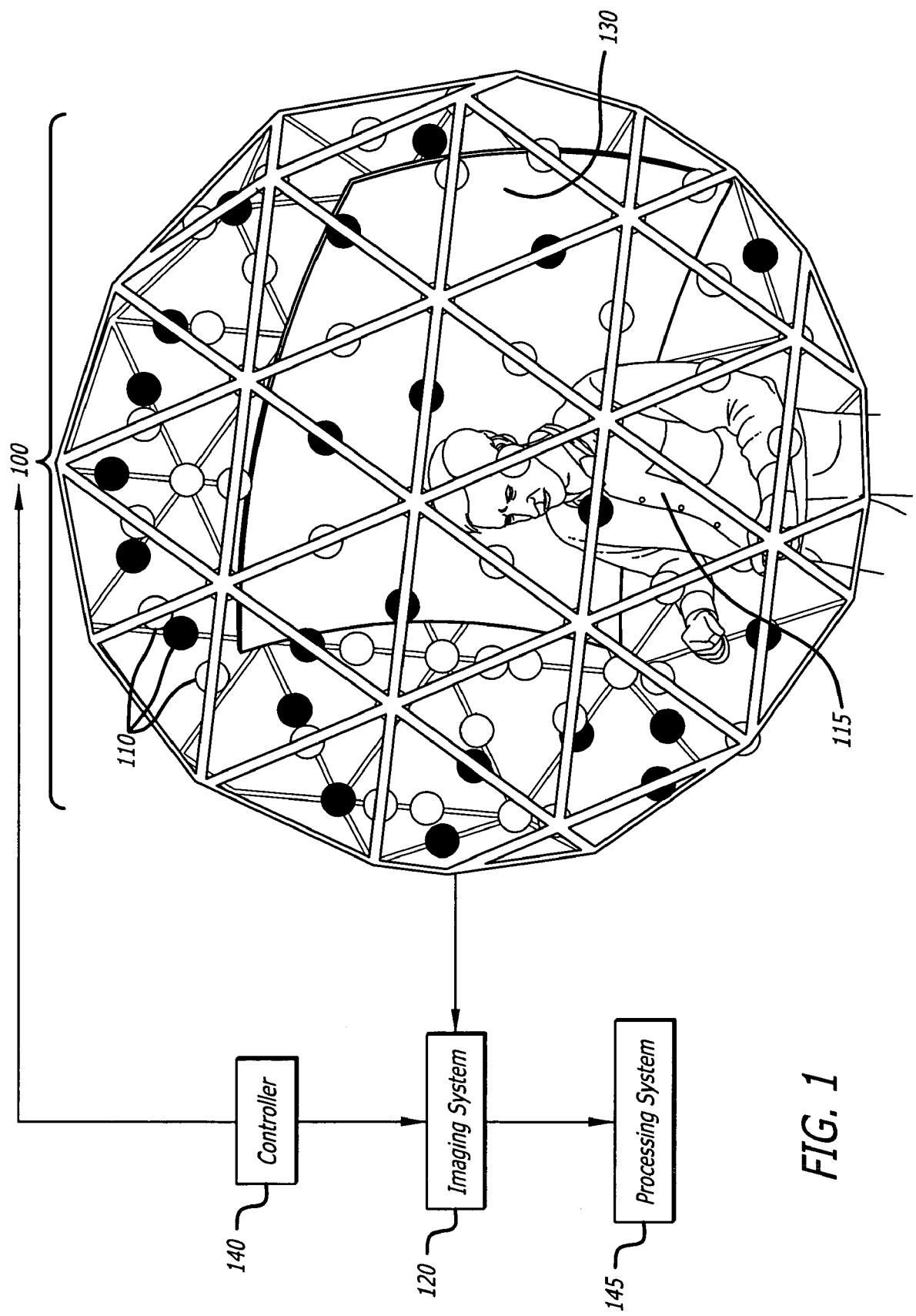
FIG. 1 schematically illustrates an apparatus for performance relighting with time-multiplexed illumination.

FIG. 1 schematically illustrates an apparatus 100 for performance relighting with time-multiplexed illumination. In overview, the apparatus 100 may include a lighting apparatus 110; an imaging system 120; a matting background 130; a controller 140; and a processing system 145. The lighting apparatus 110 may be configured to illuminate a subject 115 while the subject is undergoing a motion. The subject 115 may be an actor whose live performance is being illuminated and recorded, for later re-illumination. The imaging system 120 may be a high speed video camera, and may be configured to generate image data representative of a sequence of frames of the moving subject. The matting background 130 may be positioned behind the subject and illuminated by a separate set of light sources so that a matte image can be generated of the subject 115 shadowed against an illuminated background.

The controller 140 may be configured to drive the lighting apparatus in synchronization with the imaging system, so that the lighting apparatus sequentially illuminates the moving subject with a time-multiplexed series of lighting conditions. Each one of the frames may show the subject illuminated with one of the lighting conditions. The processing system 145 may process the image data to generate re-illumination data representative of novel illumination conditions under which the subject can be re-illuminated, subsequent to the time period.

The lighting apparatus 110 may include a plurality of light sources that provide illumination bases for illuminating the subject. In one exemplary embodiment, illustrated in FIG. 1, the lighting apparatus 110 may be shaped as a 2 m diameter once-subdivided icosahedron, with the lowest five faces left open to accommodate the subject. A light source may be placed on each edge and vertex of the stage, yielding 156 light sources an average of 18° apart. Each light source may be built from three Luxeon V white LEDs (Light Emitting Diodes), which together may produce 360 lumens. Each light source may be focused toward the subject using a Fraen wide beam tri-lens optic, yielding 420 lux at 1 meter distance. The light may be even to within 20% over the area of the subject.

Although the embodiment illustrated in FIG. 1 shows identical light sources (white LEDs) placed on an icosahedron-shaped structure, it should be understood that other embodiments may use lighting apparatuses that have configurations that are different from what is described above, and/or that have non-identical light sources. For example, in some embodiments, the light sources may be placed and directed with respect to the subject as they would in traditional cinematography, for example in typical positions occupied by key lights, fill lights, and rim lights. For example, some embodiments may include a variety light sources in their lighting apparatuses, i.e. light sources that are lighter or larger than others, that are more focused than others, or that have different colors.

In the embodiment illustrated in FIG. 1, the imaging system 120 may be a Vision Research Phantom v7.1 high-speed digital camera capable of capturing up to 4800 frames per second at 800×600 resolution. The CMOS sensor of the camera may be a 12-bit-per-channel single-chip Bayer-pattern sensor. The camera may record directly to 8 GB of internal RAM allowing for 8.6 seconds of capture at a 640×480 cropped resolution at 2160 frames per second. The camera may be comparable in cost to current digital motion picture filming equipment.

In the illustrated embodiment, the matting background 130 may be a 60×40 cm 32% gray board placed in the back of the lighting apparatus 110, to obtain the time-multiplexed matte of the subject 115. To light the board, six additional LED lights may be attached to flexible metal arms connected to the edges of the board. With just these lights turned on, the actor may appear in silhouette against an evenly-illuminated neutral background.

The controller 140 may be configured to drive the plurality of light sources in accordance with desired and/or arbitrary patterns of the illumination bases, to generate a time-multiplexed series of rapidly changing lighting conditions. In one exemplary embodiment, the controller 140 may be a Z-World Rabbit 2000 microcontroller that drives the lights in arbitrary sequences of patterns and triggers the camera's shutter in sync with each pattern. Custom driver boards distributed throughout the stage may translate TTL signals from the microcontroller into the requisite 0.7 A current-regulated power needed to illuminate the lights.

Figure 2:
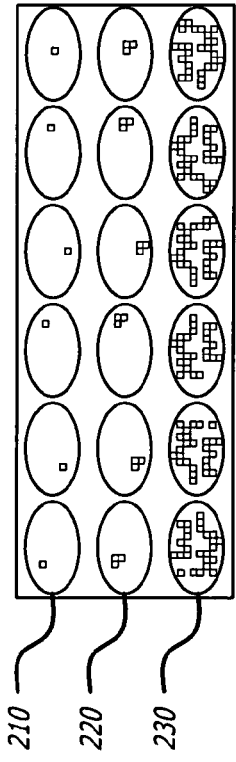
FIG. 2 illustrates six elements of each of three exemplary illumination bases used in one embodiment of the apparatus shown in FIG. 1.

The controller 140 may be configured to turn on and off any set of light sources for each frame to produce arbitrary binary patterns. Additionally, the controller may be configured to drive the lights at different gray levels through current regulation or through pulse width modulation. Any linearly independent set of patterns equal to the number of lights may allow the recovery of the subject appearance under the individual lighting directions. In several exemplary embodiments, different illumination bases may be designed and used to illuminate the subject: single lights, clusters of lights, spherical harmonic patterns, and Hadamard patterns. FIG. 2 illustrates six elements of each of three exemplary illumination bases used in one embodiment of the apparatus shown in FIG. 1.

In an embodiment in which a single light basis 210 is used, each of the 156 light sources may yield 420 lux at the middle of the stage. At a frame rate of 2160 frames per second (exposing for the majority of the 462 available microseconds) and at an aperture of f/1.2, this may produce pixel values of about 25% of the saturation level for a 98.5% white reflectance standard and pixel values of between about four and about eight percent for diffuse facial reflectance depending on the subject's skin tone. At these levels, the exposure may be somewhat dark, but acceptable relighting results may still be achievable.

To increase the illumination, an illumination basis 220 may be used that includes clusters of lights. For a subdivided icosahedron having a 5-vertex at the top, triangularly adjacent light groups may point toward either the north or the south pole. Taking all triangles pointing toward the north pole may yield a basis that is isomorphic to the single-light basis. For the configuration described in conjunction with FIG. 1, this may produce a 156-light basis that delivers 1250 lux at the center of the stage. With this basis, the clusters of lights may be used as if they were true individual lighting directions.

With the above-described triangle basis, each light source may be used on average in three different patterns. The triangle sequence may be ordered in a way that the times each light would turn on are distributed generally evenly in the sequence. This may increase the frequency of the basis by three times, which may reduce the appearance of strobing of the basis. The triangle basis may produce 75% of the maximum pixel value when lighting the white reflectance standard. For diffuse facial reflectance, the pixel values may be approximately 12-24% of this maximum.

Yet another illumination basis 230 may use patterns based on Hadamard patterns to construct an illumination basis for image-based relighting of static scenes. In this technique, there may be k basis patterns, where k is an odd number. In each pattern, just over half of the lights may be on, and across the basis each light may be on in precisely (k+1)/2 of the patterns. The patterns may be constructed so that one can recover an image of the subject illuminated by a single light by adding the images taken when the light is on and subtracting the images taken when the light is off. All other light contributions may cancel. The Hadamard patterns may significantly increase the average light output of the lighting apparatus.

In an embodiment in which the lights are distributed on a sphere, another illumination basis may be used that is based on Spherical Harmonic functions. These basis lighting conditions may require driving individual lights at different gray levels, using dimming or pulse code modulation. Since the spherical harmonic functions involve negative values, the values of the functions may be positively offset to produce non-negative basis patterns. In this case, the resulting images may be processed to subtract this offset, after being acquired. This subtraction may involve subtracting an image taken with all of the lights turned on, to generate the DC component of the spherical harmonic basis.

The processing system 145 may be configured to process the image data (from the imaging system 120) to generate re-illumination data representative of novel illumination conditions under which the subject can be re-illuminated in post-production. In one embodiment, the processing system 145 may take linear combinations of the pixel values in the basis images, In order to synthesize re-illuminated images of the subject as it would appear in a novel lighting environment. In one embodiment, the coefficients may be chosen so that the color channels of the image in each lighting condition are scaled in proportion to scene illumination measurements from substantially the same relative lighting directions. In another embodiment, the coefficients may be chosen interactively by a user, to produce a novel lighting condition that meets desired visual criteria. In yet another embodiment, different regions of the image area may be re-illuminated in different way, in accordance with different coefficients.

The synthetically illuminated images formed in these ways may exhibit image smearing artifacts due to subject motion during the time taken to iterate through the lighting conditions in the basis. This smearing problem may be substantially reduced when the motion compensation techniques described below are applied.

Figure 3:
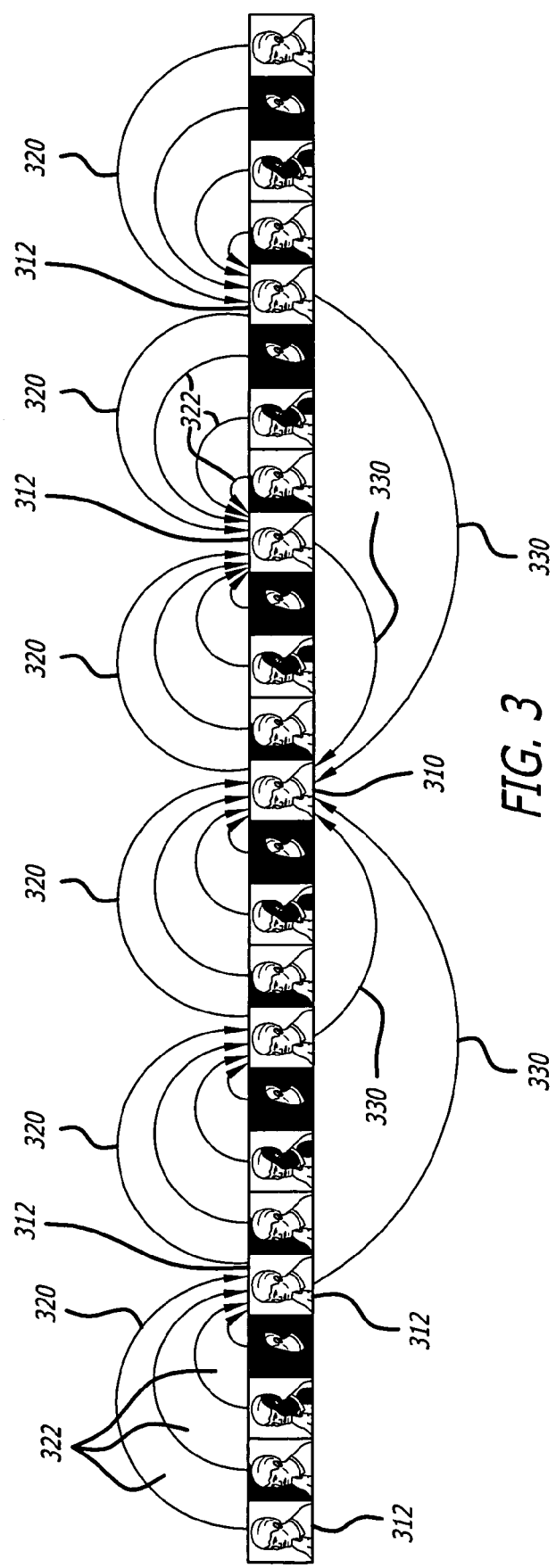

In one embodiment, the processing system 145 may be configured to compensate for the motion of the subject by estimating optical flow between one or more of the sequence of frames. FIG. 3 schematically illustrates an exemplary motion compensation process for estimating and compensating for a motion of the subject. In the illustrated embodiment, the processing system may correct for subject motion during the basis by estimating the optical flow between frames, and using this flow to warp the image data to appear as if it were taken simultaneously with a target output frame 310. By aligning the frames to the target, the relighting results may be improved.

Because the lighting conditions may change with every frame, the sequences of frames may not obey the intensity constancy assumption made by most optical flow algorithms. To make the frames easier to track, similarly lit tracking frames 312 may be placed at regular intervals within the sequence. The tracking frames 312 may be diffusely lit. One way to diffusely light the tracking frames 312 may be to turn on a plurality of light sources within the tracking frame, substantially simultaneously. Another way to diffusely light the tracking frames 312 may be to use a specialized set of light sources designed to create tracking illumination conditions. Although the tracking frames may comprise only a fraction of the frames in the sequence, they may yield sufficient temporal resolution to track most human motions.

An optical flow algorithm, for example the Black and Anandan algorithm, may be used to calculate an optical flow field between each pair of successive tracking frames. This is illustrated with the arrows indicated in FIG. 3 with reference numerals 320. These "local" optical flow fields may be linearly interpolated across the interspersed basis frames. These fields may be used to warp each basis frame into alignment with the nearest tracking frame in the direction of the target output frame, as illustrated by the arrows indicated with reference numerals 322.

Subsequently, 'long-range-range' flow may be calculated between each tracking frame and the target frame. This is illustrated with the arrows indicated in FIG. 3 with reference numerals 330. An initial estimate may be made of each long-range flow field by concatenating the local flows, and then this flow may be refined using the optical flow algorithm. These flows may directly be used to finish warping the basis frame to the target output frame, as no linear interpolation may be used required.

The long-range warps may be calculated through optical flow, using concatenations of the local warps as an initial estimate. In the illustrated embodiment, there may be sixteen basis frames and one matte frame between each pair of successive tracking frames, so 170 images may be warped in this manner to align with the target output frame.

The optical flow technique may be sufficiently robust to track and warp images of a human performance for up to 1/24th of a second earlier or later, even for relatively rapid motion such as a quickly turning head. Thus, a target frame may safely gather its set of basis frames up to 1/24th sec earlier and 1/24th sec later. If frames are gathered from both directions, the basis may span a full 1/12th of a second. For 24 fps output, this may allow the basis to be run at half the target frame rate, allowing the recording of a performance twice as long in the available storage and exposing for twice as long for each basis frame, achieving higher exposure levels. In the above embodiments, this may allow a frame rate of 12×180=2160 fps rather than 12×180=4320 fps. In one embodiment, the target frame interval may be chosen by the user. In this embodiment, the chosen frame rates may be 24, 30, or 60 frames per second. All three of these frame rates may be common denominators of a tracking frame rate of 120 frames per second.

In one embodiment, the processing system 145 may synthesize a motion blur, and apply the motion blur to the re-illuminated frames. Since the basis images are captured at short shutter speeds, there may be minimal motion blur once the basis images are aligned to a target output frame. The lack of motion blur may result in an artificially stroboscopic appearance at 24 fps. In one embodiment, motion blur may be synthesized by applying a line convolution algorithm based on the above-described optical flow fields.

In one embodiment, matte frames may also be included in the lighting sequence wherein a surface such as the board behind the subject is illuminated by light sources. This may yield a matte image, e.g. an image of the shadowed subject against the brightly lit board. In another embodiment, the matte frame is computed substantially as the difference between images where the subject is illuminated similarly and the background is illuminated differently, for example, brightly and dimly, or in two complementary colors. After filming the subject, a "clean plate" of the board may be acquired for one cycle of the full pattern sequence. Dividing each pixel in a matte frame by the clean plate's average matte frame may produce an alpha matte image where $\alpha=0$ represents the foreground and $\alpha=1$ represents the background. Noise in the matte may be reduced by using a weighted average of several of the closest matte frames to the target output frame. Like the basis images, the matte frames may also be motion compensated to align with each other. In other embodiments, the matte frames could be obtained using a more traditional matting process such as green screen, blue screen, an infrared screen, an ultraviolet screen, a sodium screen, a rear-projection screen, a front-projection screen, or a retroreflective screen.

Since the matte board receives stray light from the lights in many of the basis frames, the appearance of the stray lights in the clean plate sequence may be used to matte the actor's basis images off of the stray light onto a black background. Specifically, for a basis image F and corresponding stray light image C from the clean plate, $F'=F-\alpha C$ may be computed, to matte the basis image onto black, clamping any negative values to zero. Then, after these basis images are processed to produce a relit image of the actor L, L may be composited over a background B using the operator $L_{final}=L+\alpha B$.

In one embodiment, the processing system 145 may modify both the diffuse and specular reflectance of a performance, by processing the reflectance functions derived from the acquired image data. The reflectance functions may be 156-pixel images corresponding to the observed RGB value of a pixel of the performance lit by each lighting direction.

The surface normal may be estimated using a variant of a photometric stereo technique. Because the system is very overdetermined with 156 lighting directions, reflectance function pixels may be ignored that are likely to be image noise or specular reflections. In one embodiment, the pixel values may be sorted, the lowest 50% and top 10% of the values discarded, and a hat function may be used to weight the lighting directions at the middle of this range the highest when performing the photometric stereo.

A diffuse albedo map may also be generated: the photometric stereo technique may yield a diffuse albedo value at each pixel location, or polarized illumination conditions may be included in the lighting basis to isolate the diffuse reflection component. Additionally, an estimate of the surface point's geometric self-shadowing may be derived in the form of an ambient occlusion map. We may first assume that the surface is unoccluded in the direction of the surface normal and that pixels darker than predicted by the lobe are due to shadowing from nearby surfaces. To obtain the map we may then fit a Lambertian cosine lobe in the direction of the normal to the albedo measurement and we sum the total shortfall of the reflectance function data to the modeled lobe over the hemisphere. A specular intensity map may be generated using a color space separation of the reflectance functions or by detecting the intensity difference between differently polarized lighting conditions in the lighting basis. A specular roughness map may be generated by characterizing the breadth of the specular component of the reflectance functions.

From the surface normals, reflection mapping may be used to render the moving subject with different diffuse and specular reflectance properties as it reflects different lighting environments. While this technique may not reproduce the complexities of facial reflectance as the original basis images, it may allow the reflectance parameters to be modified in a straightforward manner. More complex reflectance transformation effects may be obtained by computing different functions of one or more of the normals, albedo, occlusion map, and the original image data. For example, using the normals to index into a diffuse convolution of a lighting environment and multiplying the irradiance values by both the albedo and the occlusion map may produce a more diffuse version of the performance when compared to the original reflectance. Setting the diffuse lobe to zero and performing specular reflection mapping into the environment may yield a synthetic specular channel for the performance. Adding this specular channel to the original performance may give the actor a glossy appearance.

The process described above may be used to produce more stylized renderings of performances. For example, by setting the albedo of the performance to a constant and multiplying by the occlusion map, the appearance of a moving sculpture may be produced. Metallic reflection-mapped performances may also be possible. Subtle changes to facial reflectance, for example to simulate the effect of the person wearing additional shine-reducing makeup or to simulate the person having somewhat oilier skin, may be obtained by linearly interpolating between the original re-illuminated performance and a version that has been transformed to be either more diffuse or more specular.

In one embodiment, the lighting apparatus may produce one or more lighting conditions that produce spatially structured illumination upon the subject. These lighting conditions may comprise horizontal or vertical stripes across the subject. In one embodiment, a video projector capable of projecting different patterns may be used to project one or more of these lighting conditions. In another embodiment, a laser that is scanned or projected through a diffraction grating could be used to generate one or more of these lighting conditions. The spatially structured illumination may comprise binary patterns, Gray code patterns, or other structured illumination patterns that may be analyzed by the processing system to estimate the three-dimensional position of the surface point seen at each pixel in the image. In another embodiment, the image processing system may perform stereo correspondence between multiple imaging system viewpoints to estimate the three-dimensional position of the surface point seen at each pixel in the image.

In one embodiment, the image processing system may use the position of each pixel's surface point within the spatially structured illumination patterns to affect how it generates re-illumination data for that pixel. For example, the image processing system may simulate virtual spotlight illumination on the subject by illuminating only those pixels that fall three-dimensionally within the cone of a virtual spotlight beam with light from the virtual spotlight's direction. In another example, the processing system may render the subject as it would appear in the dappled light under a virtual tree by determining for each pixel the amount of sunlight arriving through the leaves at its three-dimensional point in space and forming re-illumination data for that pixel accordingly.

In another embodiment, more than one imaging system may be used to simultaneously record the subject under the time-multiplexed series of lighting conditions, and the image processing system may be configured to generate novel illumination images from any of one of the plurality of these viewpoints. In another embodiment, the image processing system may use view interpolation techniques to generate images of the subject from novel viewpoints as well as under novel illumination conditions. In a still further embodiment, the image processing system may use three-dimensional scene information estimated from spatially structured basis illumination conditions, stereo depth estimation between viewpoints, silhouette-based volumetric modeling, or time-resolved depth imaging to assist in the process of rendering the subject from a novel viewpoint using an image-based rendering process. In the case of spatially structured basis illumination conditions or time-resolved depth imaging, this rendering process may work from a single original viewpoint or it may combine information from multiple imaging system viewpoints to synthesize the novel viewpoint.

In sum, a method and system have been described that use time-multiplexed illumination and high-speed photography to capture time-varying reflectance properties of a live performance. Using the described method and system, realistic relighting may be achieved for both captured and designed illumination, and realistic skin reflectance may be exhibited. The method and system described above may be useful to filmmakers wishing to design, modify, or augment live-action lighting in postproduction.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of what is disclosed above. Thus, the apparatuses and methods described above are not intended to be limited to the embodiments shown herein, but are to be accorded the full scope consistent with the claims, wherein reference to an element in the singular is not intended to mean "one and only one" unless specifically so stated, but rather "one or more."

All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether or not such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus comprising:
    a lighting apparatus including a plurality of light sources, each positioned at different locations relative to each other, each configured to illuminate a subject from a different direction relative to each other, the plurality of light sources configured to provide one or more illumination bases;
    wherein the lighting apparatus is configured to sequentially illuminate a subject with a time-multiplexed series of lighting conditions while the subject is undergoing a motion during a time period;
    an imaging system configured to generate image data representative of a sequence of frames of the moving subject, each one of the frames showing the subject illuminated with a respective one of the lighting conditions;
    a processing system configured to process the image data to generate re-illuminated data representative of the subject, undergoing the motion, re-illuminated under novel illumination conditions, subsequent to the time period; and
    a controller configured to drive the plurality of light sources synchronously with the imaging system and in accordance with a desired illumination basis pattern, so as to generate the time-multiplexed series of lighting conditions;
    wherein the controller is further configured to drive the imaging system so as to include within the sequence of frames a time-multiplexed matte frame, at desired intervals within a succession of basis frames, so as to allow the subject's motion to be composited over a new background subsequent to the time period.

2. The apparatus of claim 1, wherein the processing system is further configured to compensate for the motion of the subject by estimating optical flow between one or more of the sequence of frames.

3. The apparatus of claim 2, wherein the processing system is further configured to use the estimated optical flow to warp the image data so as to align each one of the frames with a target output frame.

4. The apparatus of claim 2, wherein the controller is further configured to drive the lighting apparatus and the imaging system so that one or more similarly illuminated tracking frames are generated, and so that the tracking frames are included at desired intervals within the sequence of frames.

5. The apparatus of claim 4, wherein the processing system is further configured to calculate an optical flow between successive tracking frames, to interpolate local optical flow fields across basis frames interspersed between the tracking frames, and to warp each one of the basis frames into alignment with a nearest tracking frame in the direction of the target output frame using the interpolated local optical flow fields.

6. The apparatus of claim 5, wherein the apparatus and controller are further configured to illuminate the subject with one or more spatially structured illumination patterns, and wherein the processing system is further configured to apply varying novel illumination conditions to one or more parts of the image, taking into account the position of said one or more parts within the spatially structured illumination patterns.

7. The apparatus of claim 2, wherein the processing system is further configured to synthesize and apply a motion blur based on the estimated optical flow field.

8. The apparatus of claim 1, wherein the processing system is further configured to process the image data to modify one or more reflectance functions for a surface of the subject, so as to transform a reflectance of the surface of the subject undergoing the motion.

9. The apparatus of claim 8,
    wherein each frame comprises a plurality of pixels, each pixel having an associated pixel value that represents the image brightness of a corresponding surface unit area on the surface of the subject; and
    wherein the processing system is further configured to transform the reflectance of the surface of the subject by generating at least one of:
        a surface normal map that provides an estimate of a surface normal value for each pixel;
        a diffuse albedo map that provides an estimate of a diffuse albedo value for each pixel;
        a specular reflectance map that provides an estimate of a specular reflectance value for each pixel; and
        an ambient occlusion map that provides an estimate of a geometric self-shadowing for each pixel.

10. The apparatus of claim 1, wherein the processing system if further configured to generate the re-illuminated data by estimating reflectance properties of the subject from image data representative of one or more of the frames, and applying novel lighting to estimated reflectance properties of the subject.

11. The apparatus of claim 1, wherein the processing system is further configured to generate the re-illumination data by recombining image data representative of one or more of the frames.

12. The apparatus of claim 1, wherein each of the illumination bases comprises at least one of:
an individual light source;
a triplet of triangularly adjacent light sources;
a cluster of light sources;
a Hadamard matrix of light sources; and
a set of gray-level intensities corresponding to an element of the spherical harmonic basis.

13. The apparatus of claim 1, wherein the imaging system comprises a high-speed camera, and wherein at least some of the plurality of light sources comprises LEDs (Light Emitting Diodes).

14. The apparatus of claim 1, further comprising a matting background positionable behind the subject and configured to be illuminated by one or more light sources so as to yield, when imaged by the imaging system, an image of the subject against the illuminated background.

15. An apparatus comprising:
a lighting apparatus including a plurality of light sources, each positioned at different locations relative to each other, each configured to illuminate a subject from a different direction relative to each other, the plurality of light sources configured to provide one or more illumination bases; wherein the lighting apparatus is configured to illuminate a subject with a time-multiplexed series of lighting conditions while the subject is undergoing a motion during a time period;
a matting background positionable behind the subject and configured to be illuminated so as to yield, when imaged, an image of the subject against the illuminated background;
a video camera configured to generate image data representative of a sequence of frames of the subject undergoing the motion, and further configured to generate matte image data representative of time-multiplexed matte frames;
a controller configured to drive the plurality of light sources synchronously with the imaging system and in accordance with a desired illumination basis pattern, so as to generate the time-multiplexed series of lighting conditions; and
a processing system configured to process the matte image data so as to composite the motion of the subject into a new background.

16. An apparatus comprising:
a lighting apparatus including a plurality of light sources, each positioned at different locations relative to each other, each configured to illuminate a subject from a different direction relative to each other, the plurality of light sources configured to provide one or more illumination bases; wherein the lighting apparatus is configured to sequentially illuminate a subject with a time-multiplexed series of lighting conditions while the subject is undergoing a motion during a time period;
a plurality of imaging systems, each of the imaging systems configured to substantially simultaneously generate from a corresponding plurality of viewpoints image data representative of a sequence of frames of the moving subject, each of the frames showing the subject illuminated with a respective one of the lighting conditions;
a controller configured to drive the plurality of light sources synchronously with one or more of the imaging systems and in accordance with a desired illumination basis pattern, so as to generate the time-multiplexed series of lighting conditions; and
a processing system configured to process the image data to generate re-illumination data representative of novel illumination conditions under which the subject, undergoing the motion, can be re-illuminated, from one or more of the plurality of viewpoints, subsequent to the time period.

* * * * *